(No Model.)

I. SMITH.
SAW SET.

No. 457,549.  Patented Aug. 11, 1891.

Witnesses  
B. S. Obas  
N. L. Collamer

Inventor  
Isaac Smith

By his Attorneys,  
C. A. Snow & Co.

UNITED STATES PATENT OFFICE.

ISAAC SMITH, OF FOWLER, CALIFORNIA.

SAW-SET.

SPECIFICATION forming part of Letters Patent No. 457,549, dated August 11, 1891.

Application filed March 4, 1891. Serial No. 383,766. (No model.)

*To all whom it may concern:*

Be it known that I, ISAAC SMITH, a citizen of the United States, residing at Fowler, in the county of Fresno and State of California, have invented a new and useful Saw-Set, of which the following is a specification.

This invention relates to saw-setting devices; and the object of the same is to effect certain improvements therein.

To this end the invention consists of the details of construction hereinafter more fully described and claimed, and as illustrated in the accompanying sheet of drawings, in which—

Figure 1:
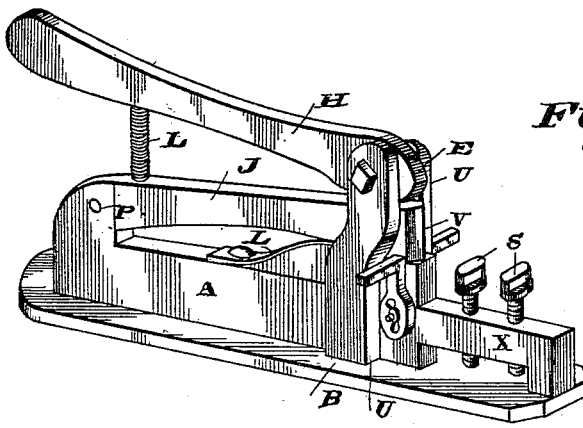
Figure 3:
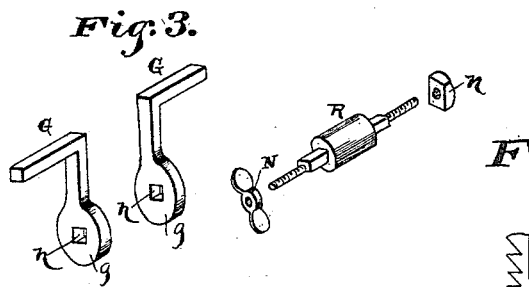
Figure 2:
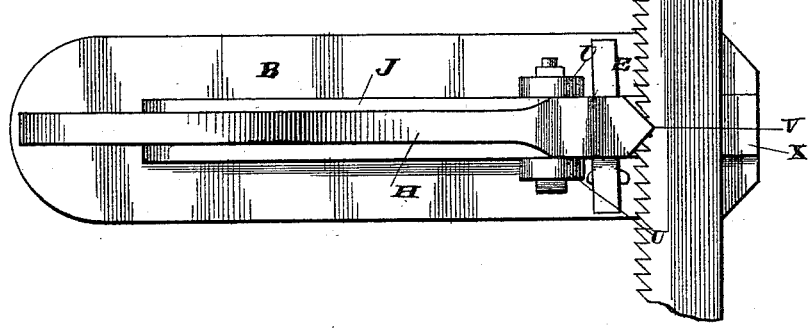

Figure 1 is a perspective view of this machine. Fig. 2 is a plan view of the same, showing a saw in position. Fig. 3 is a perspective detail of the guide.

Referring to the said drawings, the letter B designates a suitable base, and A is an anvil mounted upon and secured to said base. Rising from the sides of the anvil are uprights U, between whose upper ends is pivoted a handle H, having an eccentric head E. Pivoted at P to the anvil A, at the rear end thereof, is a jaw J, whose free end passes between the uprights and beneath the head, and preferably has a sharpened or beveled front end V, which stands over the operative face of the anvil A, and this jaw is held normally raised and against said head by a leaf-spring L, as shown. Forward of the operative face of the anvil A is an extension X, in which are seated several screws S, preferably provided with angular heads in order that they may be moved by a wrench, although ordinary screws will answer.

G G are guides which stand at the sides of the anvil and in the plane occupied by the saw-blade when it rests upon the heads of the screws S. The bodies *g* of these guides are enlarged, as shown, and provided with angular holes *h*, and R is a rod having a cylindrical center which is journaled transversely through the anvil, squared portions adjacent the ends of this center which engage the holes *h* in the bodies of the guides, and rounded and threaded extremities. Upon one of the latter is a nut *n*, and on the other is a thumb-nut N, these nuts bearing against the outer faces of the bodies of the guides, as seen in Fig. 1.

In operation the saw to be set is brought into position and laid upon the heads of the screws with its teeth upon the operating-face of the anvil. The screws are adjusted so that the saw shall stand at such angle to the anvil as it is desired the teeth shall be to the saw-blade. The thumb-nut N is then loosened and one of the guides G moved forward or backward, so that the teeth shall be permitted to pass just as far as desired under the front end V, it being understood that the squared portions of the rod R cause the two guides to move in unison, and after the adjustment of the guides the thumb-nut N is screwed up to hold them in adjusted position by pressing them against the anvil. The saw-blade being then placed upon the heads of the screws, the tips of its teeth are borne against the guides G, which stand at each side of the operating-face of the anvil, and which have been so adjusted that whatever tooth is brought under the end V it will extend only the proper distance thereunder, and the handle is brought down so as to cause its eccentric head to force the jaw J down upon the tooth immediately beneath it and "set" it in the desired manner.

What is claimed as new is—

The herein-described saw-set, the same comprising a base, an anvil mounted thereon and having an extension beyond its operative face, uprights in rear of said face, a handle journaled between the upper ends of said uprights and having an eccentric head, a jaw pivoted to the rear end of the base with its front end passing between said uprights beneath said head and above said operative face, a spring holding said jaw normally raised, adjusting-screws seated in the upper face of said extension, a rod journaled in said anvil and having squared ends with threaded extremities, L-shaped guides having holes engaging said ends, and nuts on said extremities, all as and for the purpose hereinbefore set forth.

In testimony that I claim the foregoing as my own I have hereto affixed my signature in presence of two witnesses.

ISAAC SMITH.

Witnesses:
A. DAVIDSON,
S. CHAPMAN.